(12) United States Patent
Berger et al.

(10) Patent No.: US 7,123,431 B2
(45) Date of Patent: Oct. 17, 2006

(54) PRECISE POSITIONING OF MEDIA

(75) Inventors: Ruediger Friedrich Berger, Bayreuth (DE); Andreas Dietzel, Wallertheim (DE); Thomas Frank, Selzen (DE); Volker Heinrich, Wiesbaden (DE)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 10/629,451

(22) Filed: Jul. 29, 2003

(65) Prior Publication Data

US 2004/0061966 A1    Apr. 1, 2004

(30) Foreign Application Priority Data

Jul. 30, 2002    (EP) .................................. 02017126

(51) Int. Cl.
    *G11B 15/18*    (2006.01)
(52) U.S. Cl. ...................................... 360/69
(58) Field of Classification Search ................. 360/69, 360/79, 81, 99.08, 137, 267, 134, 135; 318/611; 188/71.8; 474/152; 358/1.5; 451/59; 74/574.2
    See application file for complete search history.

(56) References Cited

U.S. PATENT DOCUMENTS

| 4,490,767 | A  | * | 12/1984 | Neuman et al. | ............ | 360/137 |
| 4,734,804 | A  | * | 3/1988 | Hanabusa | .................. | 360/267 |
| 5,205,190 | A  | * | 4/1993 | Kohring | .................... | 74/574.2 |
| 5,239,886 | A  | * | 8/1993 | Kohring | .................... | 474/152 |
| 6,112,861 | A  | * | 9/2000 | Tomoe | ........................ | 188/71.8 |
| 6,140,790 | A  | * | 10/2000 | Heine et al. | ................ | 318/611 |
| 6,346,992 | B1 | * | 2/2002 | Melzer et al. | ............... | 358/1.5 |
| 6,769,969 | B1 | * | 8/2004 | Duescher | ..................... | 451/59 |
| 6,898,051 | B1 | * | 5/2005 | Bahirat et al. | ........... | 360/99.08 |

* cited by examiner

*Primary Examiner*—Fred F. Tzeng
(74) *Attorney, Agent, or Firm*—Timothy N. Ellis

(57) ABSTRACT

An apparatus for exactly positioning a medium mounted on a spindle is provided, whereby the apparatus comprises a device for continuously changing the angular position of said medium with respect to a predefined reference position by rotating said spindle. Additionally, the apparatus comprises a friction element for braking said spindle at a predetermined position, not allowing a swing back.

22 Claims, 5 Drawing Sheets

PRECISE POSITIONING OF MEDIA

BACKGROUND

1. Field of the Invention

The present invention relates in general to measurement systems for media mounted on a spindle or media spooled onto a spindle. More specifically, the invention relates to storage media such as spinning magnetic hard disks, optical storage disks, tape drives and other overcoats on top of, e.g., optical filters, lenses or mirrors and especially to the positioning of magnetic hard disks mounted on a spindle. Still more specifically, the invention pertains to positioning such disks in a test system.

2. Description of Related Art

Magnetic disks are data carriers with a very large storage capacity. 30 GB can be stored on a magnetic disk of about 95 mm in diameter.

In addition to the high storage density the disks must have precise magnetic, mechanical as well as certain tribological characteristics. When later used in practice, the disks rotate at approx. 7200 revolutions per minute and more. This means that the outer edge of the disk reaches a speed of higher than 100 km/h during which the write/read element is at less than one twenty-thousandths of a millimeter (<50 nm) away from the disk surface.

The quality requirements can only be achieved through the greatest precision in manufacture and statistical process controls.

To achieve high storage densities, a thin film head is used for recording and reading data from modern high-capacity magnetic disks.

The surfaces of such disks and the surfaces of other materials like optical filters, lenses or mirrors may contain features in the sub-micrometer range, such as contamination, sputtering defects, impurities, presputter contamination, scratches, delamination defects, data defects, servo defects, etc. Especially, defects which are distributed across the surface of these thin film disks can significantly influence the production yield of disk drives. These defects can be caused by a local change in the topography or the magnetic structure. In the read back signal such defects lead to so-called "thermal asperities" or "missing pulses".

Even sub-micrometer defects of a few nanometers height can lead to disk failure or scrap in production. The exact characterization of these defects is therefore extremely important for today's magnetic disks.

In this, it is particularly important to create a correlation between the sub-micrometer defects, e.g., the topography of the magnetic disk or its magnetic structure and the resulting disturbances in read signals or other test signals like piezoelectric response, acoustic emission response, laser doppler response, optical response, etc. This is a basis for a general analysis of defects on the storage medium.

To detect errors in the test signal, spin stand testers are used. In particular, for detecting topographic defects, glide testers or optical disk analyzers are used and for magnetic disk characterization, magnetic spin stand testers are utilized. However, the test signals of the above mentioned test systems allow only a limited interpretation of the defects based on read signal analysis, whereas other or additional test techniques allow a further investigation of defect areas or other areas of interest. Using several characterization methods leads to a complementary analysis of defects. Using a combination of these techniques permits to optimize manufacturing parameters and therefore yield to better hard disk drive (HDD) quality.

A characterization with regard to topography and the magnetic characteristics can, however, be carried out using an atomic force microscope (AFM) or magnetic force microscope (MFM). The maximum range which can be recorded with such devices is typically limited to an area of 100 μm×100 μm. However, an analysis of an area of 20 μm×20 μm or below is more convenient in terms of defect characterization precision.

A disk failure analysis is carried out in the following typical way: The storage medium having a potential defect is mounted to the spin stand tester and fixed with the spindle, e.g., by a clamp mechanism. Defects are identified at high rotational speed as a particular response of the sensor (e.g., magnetoresistive element, piezoelectric element, etc.). The position of identified defects is given precisely by a radius $r_i$ and an angular position $\phi_i$ in respect to reference values $(\phi_0, r_0)$. For example the defect angle $\phi_i$ is counted from a predefined reference position $\phi_0$ given by the spindle drive, spindle electronics or spindle software (e.g., a pen marker or a TTL index signal) and the alignment of the sensor against a magnetic disk or a reference caliper. $r_i$ is counted from the disk edge or a predefined written track in the magnetic storage media.

For further analysis, the storage medium is removed from the spin stand tester and inserted into the complementary analysis tool (CAT). However, the defect co-ordinate system is lost in this removal and reinsertion into the CAT. The offset induced by the removal and reinertion to the new analysis tool can be up to 700 μm, which is not suitable to perform an automated measurement, because further searches and/or individual searches are still necessary. A CAT tool is for example a SEM, SIMS, EDX, AFM or even a defect marking tool.

In order to overcome this disadvantage, a combination of a MAG tester (magnetic tester, spin tester) and an AFM has been proposed in the state of the art (U.S. Pat. No. 6,297, 630) which is able to directly and quickly detect and characterize sub-micrometer defects on the surface of magnetic disks.

In Research Disclosure n428, vol. 12, 1999, page 1676, a combination of a Glide Height Tester (GHT) or Acoustic Emission Tester (AET) and an AFM is disclosed. When using a GHT, a specific measuring head flies over the rotating thin film disk. The head is not able either to read or write. However, in case it strikes an elevation on the surface of the disk, a piezoelectric signal is generated due to the hit of the head with this asperity. The test signal is correlated to the height of the elevation. The information of the height and size of defects which is determined via the GHT sometimes depends on its calibration and is sometimes not sufficient for nanometer analysis and quality control. The GHT allows a generation of a defect map $(r_i, \phi_i)$. The proposed combination uses a similar coordinate system between the GHT and the CAT. Based on the defect co-ordinates determined by the GHT, the CATs are positioned at the defects for further analysis. Thus, the topography of the disk defects or other data can be measured directly.

As can be taken from the above, measurements on hard disks, especially on a nanoscale, are performed while the disk is located on a spindle. As a consequence that the disk is not removed from the test unit, the co-ordinate system which is defined by the spindle, the test setup and the test software is not lost.

After having generated a defect map by measuring defects on the rotating disk, each single defect now can be selected and is then specifically positioned with respect to the CAT and measured. This, however, has to be done while the disk is not rotating at, e.g., 7200 RPM, i.e., the disk being stationary or rotating only very slowly. For the positioning of defects for CAT measurement the disk and/or the CAT have to be positioned precisely relative to the measurement position. The angular position can be changed by rotating the spindle where the disk is clamped, e.g., by a stepper motor.

A specific sector of the storage medium, i.e., the magnetic disk, can be positioned at any angle at very high precision by counting encoder signals (TTL signals) in dependence of the angle relative to a zero position. This is shown in FIG. 1. These pulses may come from a commercial spindle or are generated by additional hardware or software. When the target in angular position (TAP in FIG. 1) is reached, the rotation has to be stopped by a break mechanism or the spindle rotation has to be slowed down by a defined procedure (e.g., a ramp which reduces the spindle rotation velocity). For example the stepper motor movement can be halted or can be ramped down. The ramp down of the stepper motor is associated with a ramp down time which leads to a spindle angle offset (SAO) relative to the initial angular position (TAP). This spindle offset can be compensated by a new $TAP_{new}$=TAP−SAO. However different spindle rotation velocity and stepper motor parameters might require different SAOs. SAO can be significantly high owing to the computer control time and computer communication time with the stepper motor. In particular, a hardware dependent behavior was observed. In contrast to ramp down, the abrupt stopping causes post oscillations of the spindle resulting in angular inaccuracies.

Typically, a spindle is controlled and operated by using encoder signals (typically 2) and an index signal (one index signal for one turn). These signals (e.g., TTL signals) are used to define the rotational speed and rotational direction. The number of encoder signals is well-defined for one turn. The number of encoder signals, in respect to the index signal, defines an angular position. When the spindle rotates, starting at the index signal, a counter may count only the rising edge (transition from 0V to 5V) of the TTL encoder signal. In the following, an example is given that is illustrated by FIG. 1. It is assumed that there are 1000 encoder TTL signals per rotation of the spindle. In case a sector of interest of the storage medium is to be positioned at an angle $\phi$ of 115.95 degrees relative to a zero position (for investigating a defect on the magnetic disk located at exactly this position), the spindle has to be rotated by 115.95/360×1000 encoder signals forward, in other words, by 322 steps ($P_{In}$) and a fraction of 0.83 steps ($P_{Fr}$).

The number of index pulses can be counted very precisely by a software or hardware counter. However, stopping a moving mass like a spindle at a certain position, e.g., in the above example, at 322 index pulses, causes a certain oscillation when it is stopped "abruptly". It has to be mentioned that these oscillations do not lead to exactly the same end positions of the spindle in every case, depending on spindle velocity and spindle mass, spindle mass distribution and spindle friction parameters. An example of such oscillations is given in FIG. 1.

FIG. 1 shows the oscillations being represented by a continuous line. TAP is the angle position of the medium where the spindle is braked (after the 322th encoder pulse) and FA is the final angle position of the medium after the spindle has come to a complete stop. It can be seen that the counter adds 5 encoder pulses (1 to 5 in FIG. 1) during the oscillation. It has to be mentioned that in this example only TTL signals from 0 to 5V (rising edge) are counted. However, these edges from the signal appear in both rotational directions, in particular during the swing back of the spindle. Accordingly, any positioning which counts such pulses owing to oscillation of the spindle is not very exact and leads to severe errors in positioning. This, in turn, may lead to miss-positioning of defects for the CAT and as a consequence, to an analysis of an area which is not representative for the failure. In our example the miss-counting of only 1 TTL signal causes a positioning error of 50–100 μm.

Post oscillations of the spindle can be excluded by using damping parameters of the spindle in such a way that an aperiodic behavior is adjusted. This is known from literature and is used in numerous measuring instruments. However, adjusting an exact aperiodic behavior requires additional hardware for damping the spindle movement. During the spin tests at higher rotational velocities this hardware must be disabled or withdrawn. Furthermore, the damping parameters and behavior have to be well adjusted to achieve the aperiodic condition. If the aperiodic condition is not met exactly, then either the spindle swings back resulting in additional unwanted index pulses or the spindle slowly rotates towards its final position (creep-condition). Even a very small swing back can lead to an additional counting of a TTL signal. In principle, the creep-case can be used to exclude a swing-back. As explained later, the stepper motor is used for fine positioning of the spindle. In case of the creep-case-condition being adjusted and the final position of the spindle angle (i.e., the position of the defect or the like to be analyzed) being reached, the spindle rotates further slowly away from this final position. Thus, adjusting the creep condition cannot be used for fine positioning.

Both cases can be adjusted by adding a damping device (e.g., eddy current brake) which effect is described via a velocity dependent term. Its proportional factor is given by the damping factor $\beta$. Friction forces between two bodies are basically not velocity dependent and therefore do not contribute to this term. It is known from literature that a movement (e.g., a pointer in a measurement device) which is dominated by friction term leads to different end portions than a movement not dominated by the friction term. Therefore, a friction term is not wanted in measurement applications.

To solve the positioning problem, it is possible to define non-identical index pulses or a continuous signal in dependence of the angle (e.g., the height of a signal) what, however, would require more electronic effort to read out each of the pulses separately. This would lead to additional hard- and software to be installed.

In addition, it would be possible to differentiate a movement of the spindle backward or forward to separate counts. However, in this case, more soft- and hardware is required as well.

Furthermore, it would be possible to reduce the rotational positioning speed so that the above described effect of post oscillations is minimized or does not occur. This, however, causes a longer rotational positioning time which is not desired. Only a positioning time of a few seconds is tolerable for most applications.

Thus, there is a need to provide a device and a method to stop the spindle in such a way that an exact positioning of the spindle is possible, by simultaneously keeping a small overall positioning time.

SUMMARY OF THE INVENTION

It is therefore the object of the invention to provide a device, a method and a counting technique that allows for the precise positioning of a medium positioned on a spindle.

It is a further object of the present invention to provide such a device whereby no swing back oscillation of the spindle occurs.

It is another object of the present invention to provide such a device for a medium showing sub-micron features on its surface, whereby said features essentially determine said medium's performance.

It is still another object of the invention to provide such a device and method that can be easily implemented and adjusted and is not very cost-consuming. In addition the method shall not alter spin test performance or impact spin test warranty.

These and other objects and advantages are achieved by the apparatus (device) and method disclosed in the claims.

Advantageous embodiments of the invention are disclosed in the dependent claims.

DESCRIPTION OF THE DRAWINGS

The invention will in the following be described in more detail in conjunction with the drawings, in which FIG. 1 schematically shows the oscillations of a spindle occuring when braking a magnetic disk mounted on this spindle.

DETAILED DESCRIPTION OF THE PREFERRED EMBODIMENT

Though the invention may be used for the precise positioning of other media than magnetic hard disks, e.g., for optical filters, lenses or mirrors—detecting sub-micron features like defects, etc. on such surfaces by means of respective common high quality test methods, and analyzing the features found with a CAT is also important—the precise positioning method of the present invention will, in the following, only be described with respect to a spinning magnetic disk.

The underlying idea is to position magnetic disks precisely by using a combination of a spindle friction element to adjust static and dynamic friction and a respective counting technique for exactly moving the spindle to its exact position.

As has been already mentioned above, abruptly stopping the spindle leads to oscillations of the spindle causing an inexact positioning of the magnetic disk, and thus an exact measurement of the defect or the like on the disk is not possible. Accordingly, it is necessary to brake the spindle in such a way that no oscillation (swing back) of the spindle occurs.

Figure 1:
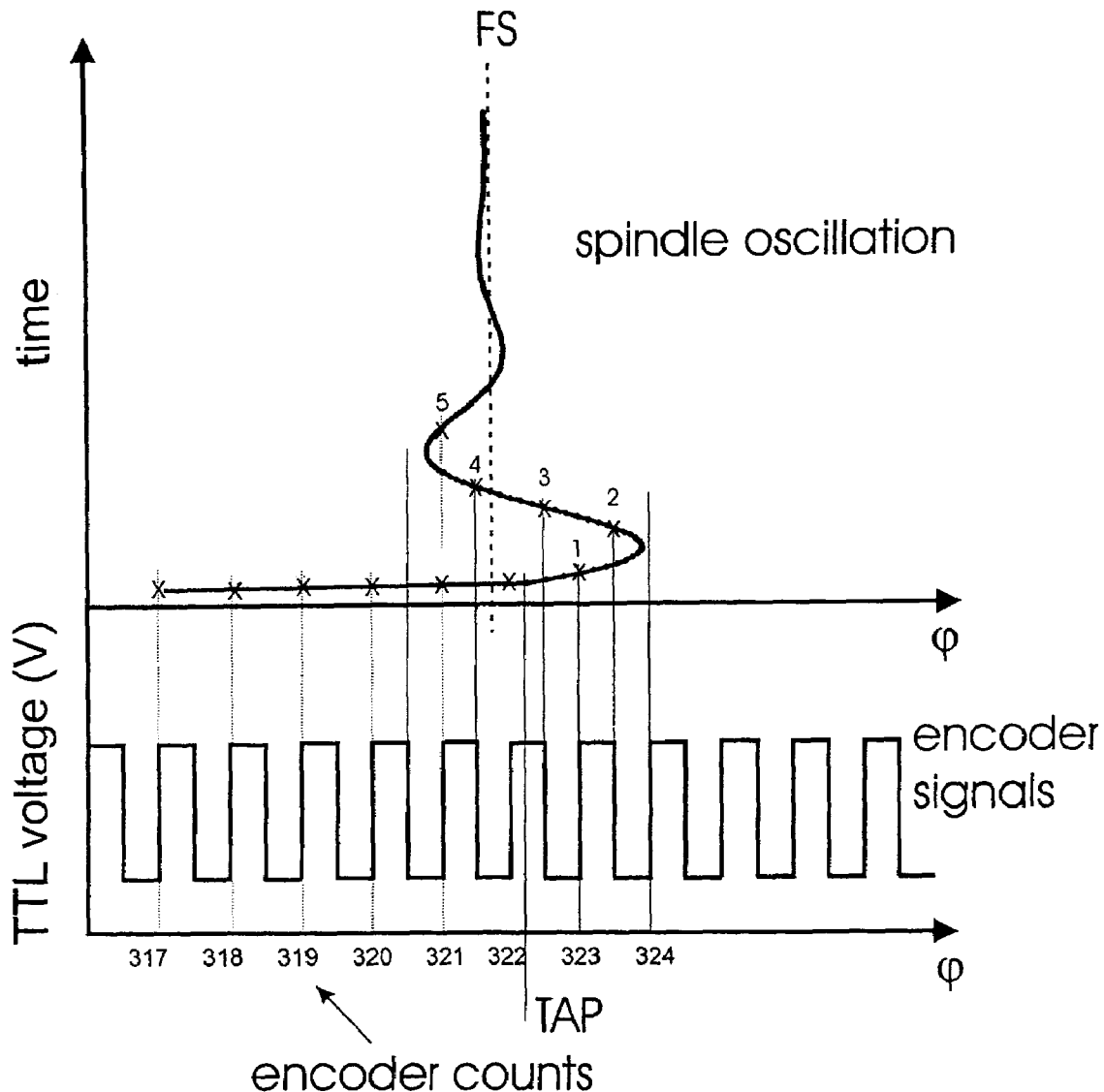

As will be shown, this can be done using an additional friction element, which prevents the oscillation behavior shown in FIG. 1. Together with counting the encoder signals, this allows to precisely position a medium.

Friction forces act between two bodies in contact which are moved against each other. The friction force is parallel to their contact area and is directed to the opposite side of the body's movement. The friction force $F_f$ is smaller than the normal force $F_N$ (FIG. 2B) and is described using the friction coefficient μ by $F_{SB}=\mu F_N$. Two different friction modes exist: First, the static friction which takes place when a body is not moving against the other body. This static friction has to be overcome when this body is to be moved. The parameter describing the static friction is $\mu_0$. Second, when two bodies that are in contact move against each other, the sliding friction takes place. The sliding friction $\mu_g$ is smaller than the static friction ($\mu_0 > \mu_g$).

Figure 2A:
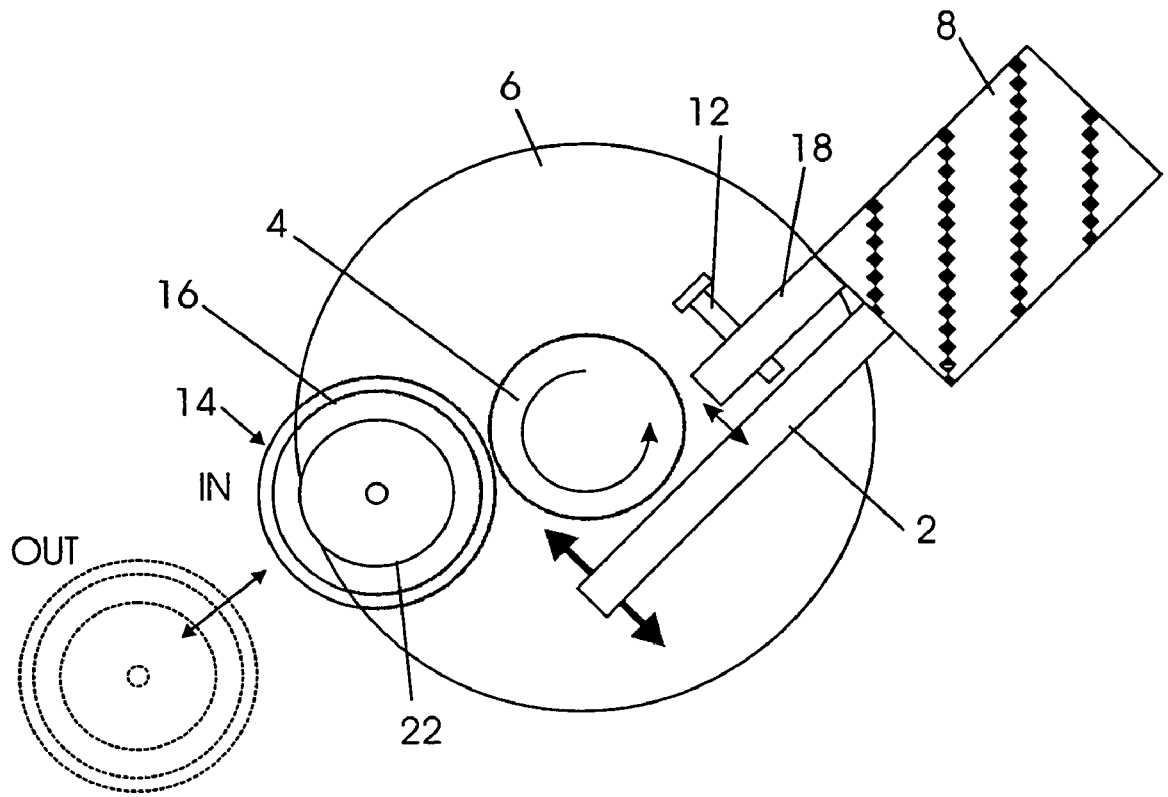
FIG. 2A is a top view of the spring bar device according to the invention.
Figure 2B:
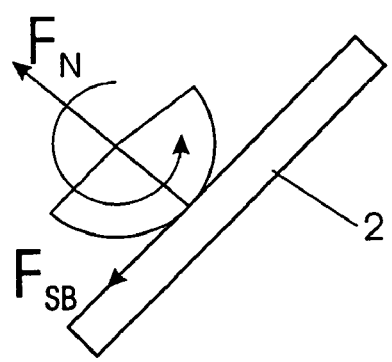
FIG. 2B schematically shows the forces acting on the spindle.
Figure 3A:
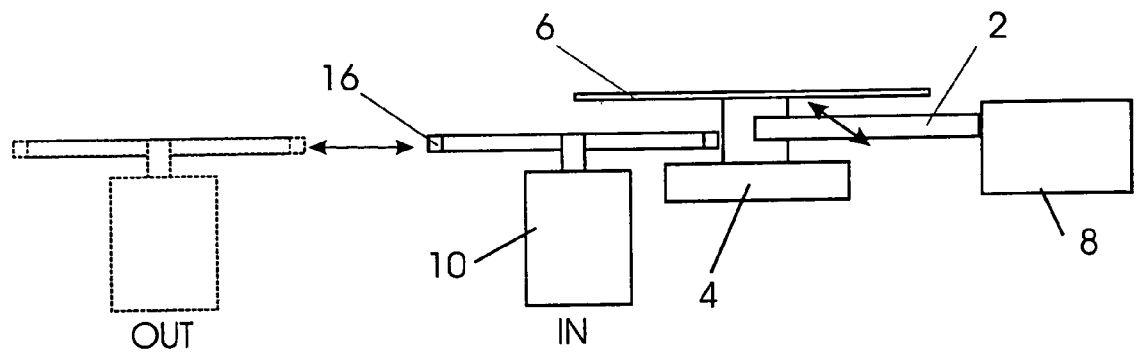
FIG. 3A is a side view of the spring bar device of FIG. 2A.
Figure 3B:
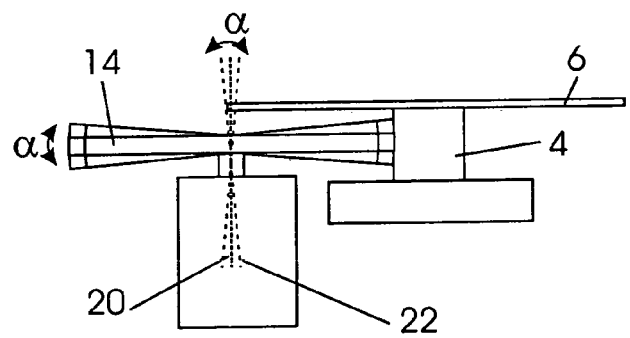
FIG. 3B schematically shows the relation between the stepper motor turning axis and the rotational axis of the friction wheel of the stepper motor.

FIGS. 2 and 3 schematically show an example of the apparatus according to the invention. A magnetic disk 6 to be investigated is mounted on a spindle hub 4. A stepper motor 10 is mounted next to the hub 4. The stepper motor 10 consists of a rotational axis 22 which can be rotated very precisely step by step via an electronic controller unit. At the rotational axis 22 a turning or friction wheel 14 is fixed for transformation of the rotation to another element (e.g. the spindle 4). The friction wheel 14 can be made of metal or plastic. The wheel can be coated by a specific coating 16 for friction wheels (teflon) or an elastic ring (rubber) can be attached. This coating is used to enable a good contact with the spindle. In particular, a material is selected which does not show a strong hysteresis when the stepper motor is rotated clock- or counter-clockwise. Furthermore, the material of the coating is selected such that it does not relax strongly as a function of time.

Two positions of the stepper motor 10 arrangement can be selected. One position is for locating the friction wheel 14 to be not in contact with the spindle 4 (position "out"). This is used when the spindle stand test is performed. In the second position (position "in"), the friction wheel 14 is in defined contact with the spindle 4. This position is used during the positioning procedure of the CAT. Both positions can be adjusted by using a mechanical switch or relay. The stepper motor 10 can be more precisely approached by using a linear table. This allows a careful adjustment of the pressure used to press the elastic ring or coating 16 against the spindle 4.

A bar 2, made, e.g., from a metal like aluminum or the like, or being made of steel coated with teflon to minimize abrasion so that the apparatus may be used within a clean room, is arranged below the magnetic disk 6 near the spindle hub 4. This bar may be formed of a flexible spring that can be pressed against the spindle hub 4 and released again (cf. the grey double arrow in FIG. 2). The movement of the bar is controlled by a relay 8 connected to the bar. It may also be controlled by an air pressure cylinder or the like. The relay 8 is controlled by software. The force $F_N$ used to press the bar 2 against the spindle hub 4 (cf. FIG. 2B) can be adjusted by means of an adjusting device, e.g., by a screw 12 having a variable stop 18, which allows to increase or decrease the friction force. Instead of using a screw 12, the amount of electrical current of the relay 8 can be used to adjust the force of the bar against the spindle hub 4. A spring balance having a scale or the like may also be used. In general, the force depends on several parameters like the length of the spring, the spring constant, the excursion of the spring, the Young's modulus and the friction coefficient of the materials used.

The friction force of the bar 2 (in the following called $F_{SB}$, cf. FIG. 2B) can be subdivided into two different portions, namely the sliding friction part (in the following called $F_{SlSB}$) and the static friction part (in the following called $F_{StSB}$). When the spindle is static and the stepper motor is started, the static friction has to be overcome. Once the spindle rotates, there is only the sliding friction. According to the present invention, $F_{SB}$ can be used to achieve non-oscillatory braking conditions of the spindle hub 4. This will be described in the following with respect to FIG. 4, thereby using the example given in connection with FIG. 1.

Just before starting the actual positioning procedure, i.e., when the CAT is activated, the bar 2 is pressed against the spindle hub 4 with a defined force that can be adjusted by the screw 12 (the adjustment procedure is explained in more detail below). The spindle hub 4 carrying magnetic disk 6 under investigation is rotated by the stepper motor 10 counter-clockwise (cf. the bended arrow in FIG. 2) towards its final position, i.e., the position of the defect or the like to be measured ("a" in FIG. 4). When a predefined encoder signal number (in the case shown at TAP=317, this value depending on the specific apparatus used) is reached (in this case TAP=$P_{In}$-x, where, in this example, x=5 and $P_{In}$=322, cf. FIG. 1), the stepper motor is stopped. Due to the mass moment of inertia the spindle 4 rotates further in counter-clockwise direction. However, the elastic ring or coating 16 (FIGS. 2, 3) of the stepper motor and the electromagnets inside the stepper motor are acting against such spindle rotation. Therefore the spindle rotation is slowed down ("b" in FIG. 4). When most of the rotational energy is dissipated into potential energy of the elastic ring or coating 16 of the stepper motor 10, a specific amount of force $F_E$ occurs which acts on the spindle in the opposite direction to initial spindle rotation, i.e., in the direction of clockwise rotation. This is shown by the turning point "T" in FIG. 4, where the grey line indicates the swing back of the spindle hub 4. The bar 2 pressed against the spindle hub 4 thereby realizes an additional friction element which reduces velocity of this counter-clockwise rotation due to the sliding friction term, $F_{SlSB}$. However, the friction force of the spring $F_{SB}$ can be adjusted in such a way using $F_N$, that at the turning point "T", the force of static friction, $F_{StSB}$, is higher than $F_E$. As explained before, the static friction has to be overcome until the spindle is rotated. Thus, a swing back of the spindle hub 4 is excluded and the position of the spindle is stable ("c" in FIG. 4). Since all counter-clockwise directions in part b are counted by the counting technique according to the invention, the actual range of "b" is not critical.

The actual position of the turning point "T" in the present example is encoder signal 319. Fine positioning to the final defect angle FA (encoder signal 322.83, cf. the example of FIG. 1) is represented by sections "d" to "f" in FIG. 4 and will be described in the following.

As has been described before, there is no oscillation of the spindle hub 4 at the turning point "T", corresponding to a value of 319 encoder steps, i.e., this position is static. However, the exact position of the spindle between encoder signals 319 and 320 is not known since only the rising edges of the pulses are counted. Now the stepper motor 10 is used to turn the spindle stepwise (motor steps MS) in counter-clockwise direction by small angles $\phi$ ("d" in FIG. 4), i.e., from one encoder signal to the next. Turning the friction wheel of the stepper motor increases the force $F_E$ and in case $F_E$ exceeds $F_{StSB}$, the spindle will rotate a small angle in the counter-clockwise direction. The precision for fine positioning is increased by a stepper motor having high accuracy, by using a mechanical translation, a friction wheel with a smaller diameter and/or materials having a small difference between the coefficients of the sliding and the static friction.

Figure 4:
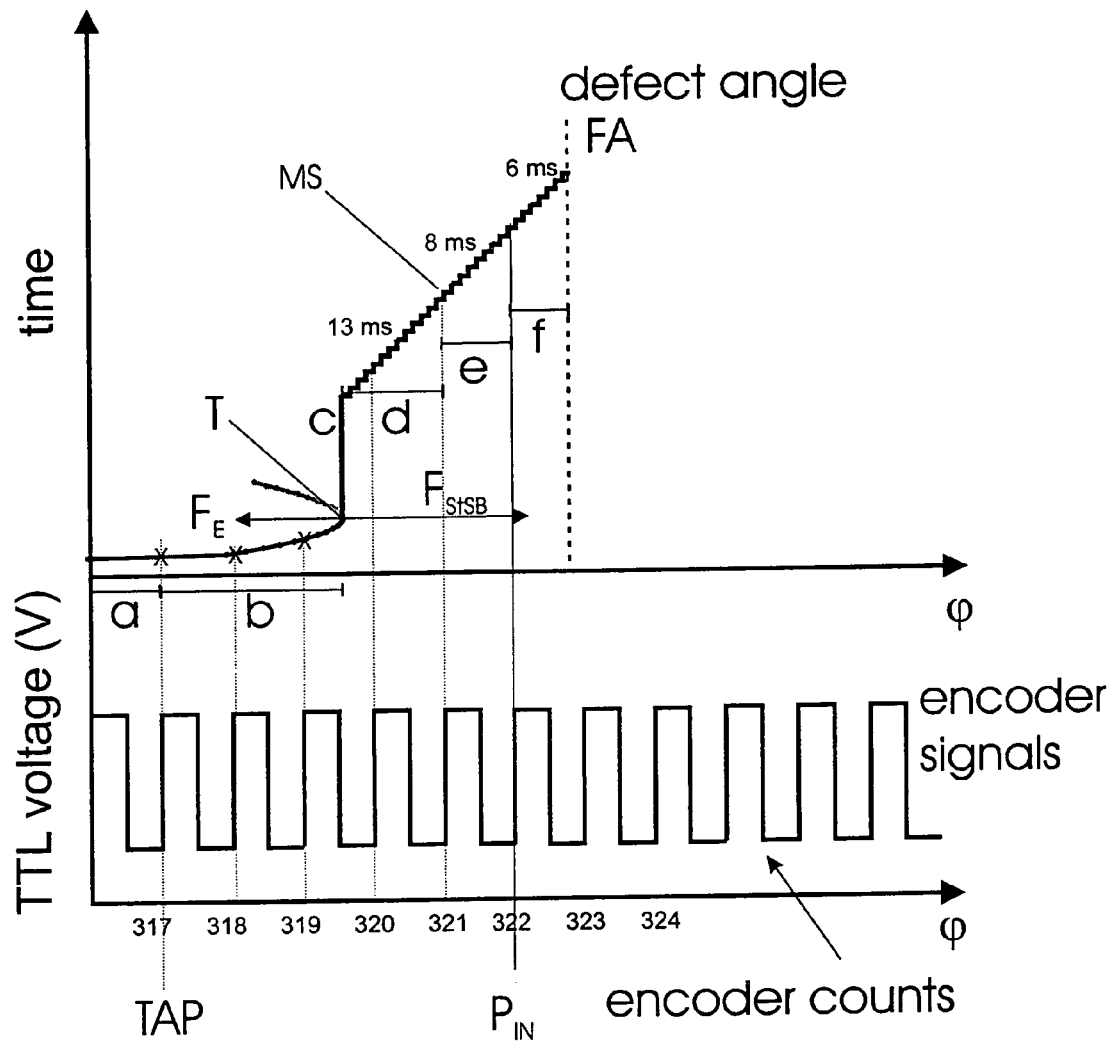
FIG. 4 shows spindle behavior using the adjusted spring bar device.

When the spindle is rotated stepwise, the next encoder signal that is reached in the present example is signal 320. The stepwise rotation is continued until the encoder signal number $P_{In}$-1 is reached, i.e., encoder signal 321. In the example outlined in section "d" in FIG. 4, 13 MS are necessary to reach encoder signal 321. Then the number of motorsteps MS between this encoder signal and the next one, $N_{PIn-(PIn-1)}$, is counted ("e" in FIG. 4). In the example of FIG. 4, a number of $N_{322-(322-1)}$=8 is obtained. Based on this value the remaining number $N_{Fr}$ of motor steps MS, which are necessary to reach the encoder signal fraction $P_{Fr}$=0.8 is calculated by using the equation $$N_{Fr}=\text{int}(P_{Fr} \times N_{In-(In-1)}),$$

which in the present example leads to a value of 6. This calculation has the additional advantage that also unwanted influences like, e.g., balance errors of the stepper motor and the like, are excluded.

Then the spindle is turned further for $N_{FR}$=6 MS in counter-clockwise direction ("f" in FIG. 4). Now, the defect angle FA has been reached.

This fine positioning method improves angular position accuracy by reading encoder signals only. The positioning resolution is therefore dependent on the number of motorsteps MS between two encoder signals. The number can be increased by a high resolution stepper or dc motor or by a down-transformation. The latter can be realized by a friction wheel having a small diameter or a turning transformation.

One advantage of this technique is that the friction wheel need not be positioned very exactly with respect to the spindle and therefore different types of motors can be used without changing the software or modifying the counting technique. In particular, it is allowed that the stepper motor turning axis 20 and the rotational axis 22 of the friction wheel being different (i.e., forming an angle $\alpha$ shown in FIG. 3B) This leads to a non-uniform turning of the spindle with a periodicity of 360 deg. The used counting technique measures the distance between encoder signals in terms of motor steps MS at an angle very close to the defect. Here the turning uniformity difference between two adjacent encoder signals can be neglected. Even further non-uniform turning periodicity larger than two encoder signals are allowed and do not influence substantially the positioning accuracy. These changes may come from the shape and mounting of the friction wheel.

The system disclosed here has the advantage that it combines a very fast and exact positioning of the spindle, so that no defects found by means of the spin stand tester can be missed. Consequently, a higher throughput can be achieved and the measuring system can be highly automated to achieve high throughput. The adjustment procedure of the bar at the turning point "T" ($F_{StSB}$>$F_E$ or $F_{SlSB}$>$F_E$, respectively) which is pressed against the spindle hub can be realized by the following techniques:

$F_E$ is dependent on the velocity of the spindle and the friction wheel material and friction wheel coating; the higher the velocity, the higher $F_E$. Therefore, the term $F_{StSB}$ is adjusted for the maximal velocity of the spindle which is determined by the velocity of the stepper motor. The latter is computer controlled and this rotational speed can be adjusted precisely. The next adjustment process is described in the following.

To prevent oscillation of the spindle, the friction force of the spring bar device has to be adjusted to $F_E$<$F_{SB}$, in that the oscillation of the spindle backwards is excluded. This can be realized by looking at a characteristic or well-defined marker on the disk surface (e.g. artifical defect) or at the spindle (e.g. scales) via an observation tool (e.g. High Speed camera or photo detector). The observation of the characteristics or well-defined marker during the positioning procedure represents the spindle behavior and enables a statement of the oscillation behavior of the spindle, when the spindle is braked by the stepper motor stop.

Figure 5:
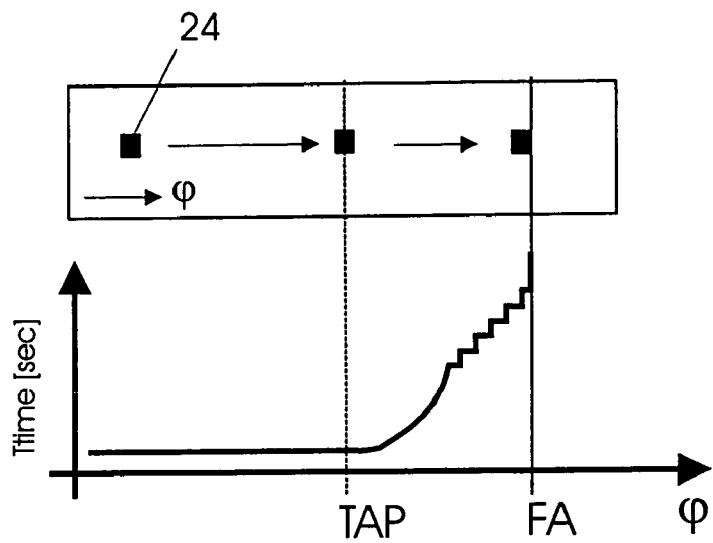
FIG. 5 shows the typical case of the adjusted friction force terms of the spring bar device.

FIG. 5 schematically depicts an example of an adjustment procedure of the friction force at the bar 2. TAP is the angle position of the medium, where the spindle is stopped and FA represents the final angle position of the spindle, i.e., the angle of the defect to be observed. The grey rectangle indicates a characteristic or well-defined marker on the disk surfaces or at the spindle.

The well-defined marker is monitored via an observation tool, e.g., a High Speed camera or a photo detector. The case shown indicates the spindle positioning behavior, when the friction force is adjusted so that no oscillation backwards occurs. It can be adjusted by a screw 12 at the bar. When the spindle is braked at TAP, it moves without any oscillation towards the final angle position FA. In the example shown in FIG. 5, it is not necessary to adjust one well defined force value. It is only important that a force is adjusted which is higher than $F_E$.

The adjustment procedure of friction force is performed by changing the friction force until the shown case is performed (FIG. 5).

Figure 6:
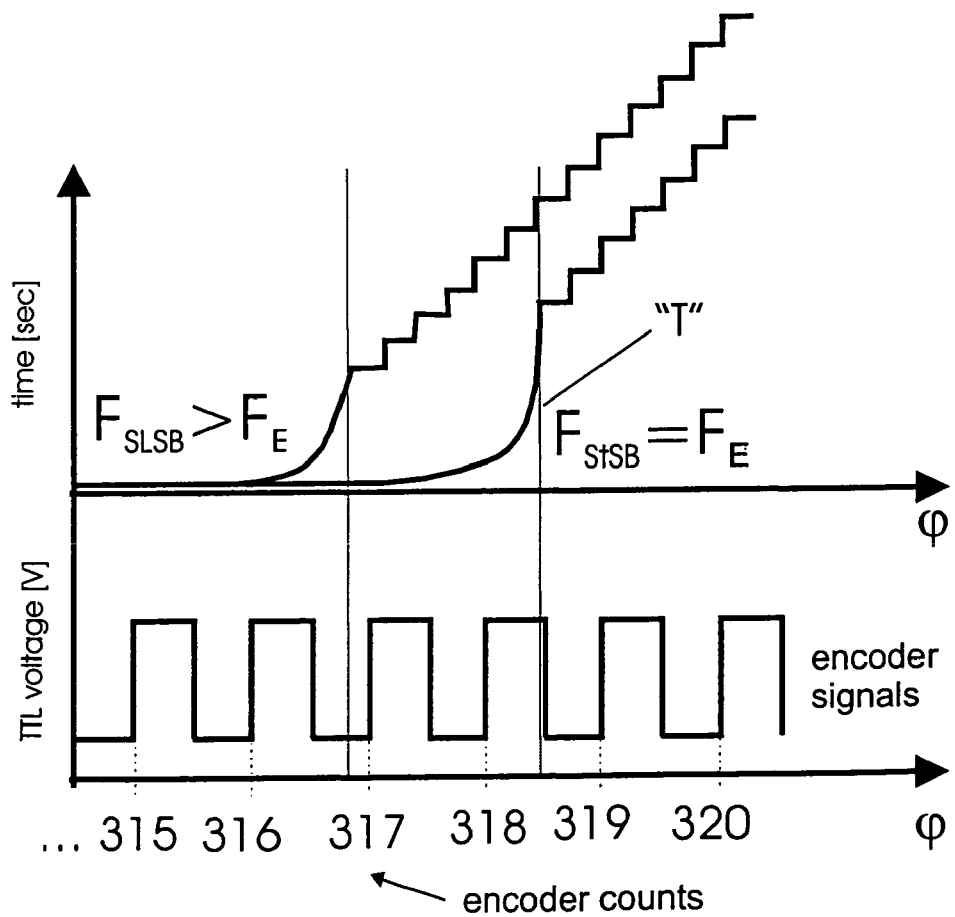
FIG. 6 shows the typical case for two possible adjustments of the spring bar device to exclude a swing-back and spindle oscillations.

Even a higher friction force than $F_{StSB}$ can be adjusted by the bar. This leads also to a precise positioning of the spindle. This case is outlined together with the $F_{StSB}$ case in FIG. 6. In contrast to the case where the spindle is stopped at the turning point "T" at a higher friction force, the spindle is stopped before the turning point. This eliminates spindle oscillation and allows a good tolerance in adjusting the spring bar device.

The positioning technique can also be used for precise definition of the starting point, in particular the angle between the index or encoder to a reference position of the disk. The technique according to the invention allows a quick and precise positioning of a medium mounted on the spindle.

The following entries are examples of aspects of the invention:

Entry 1. An apparatus for exactly positioning a medium (6) mounted on a spindle (4), said apparatus comprising a device (10) for continuously changing the angular position of said medium with respect to a predefined reference position by rotating said spindle, characterized in that said apparatus additionally comprises a friction element (2) for braking said spindle at a predetermined position, not allowing a swing back.

Entry 2. The apparatus according to entry 1, wherein said device (10) is a stepper motor.

Entry 3. The apparatus according to entry 1 or 2, wherein said friction element (2) comprises a bar being adapted to be pressed against said spindle (4).

Entry 4. The apparatus according to entry 3, wherein said bar (2) comprises a flexible spring.

Entry 5. The apparatus according to entry 4, wherein said spring is connected to a relay (8).

Entry 6. The apparatus according to entry 5, wherein said relay (8) is software-controllable.

Entry 7. The apparatus according to entry 4, wherein said spring is connected to an air pressure cylinder.

Entry 8. The apparatus according to any one of entries 3 to 7, wherein said bar is made of a metal.

Entry 9. The apparatus according to entry 8, wherein said metal is aluminum.

Entry 10. The apparatus according to any one of entries 3 to 7, wherein said bar is coated with a low abrasive material.

Entry 11. The apparatus according to entry 10, wherein said bar is made of teflon coated steel.

Entry 12. The apparatus according to any one of entries 3 to 11, wherein the force with which the bar is pressed against the spindle is adjustable by means of an adjusting device.

Entry 13. The apparatus according to entry 12, wherein said adjusting device is a micrometer screw (12).

Entry 14. The apparatus according to any one of the preceding entries, wherein said medium (6) is a spinning medium.

Entry 15. The apparatus according to entry 14, wherein said spinning medium consists of a magnetic disk.

Entry 16. The apparatus according to any one of entries 1 to 13, wherein said medium (6) is a magnetic tape.

Entry 17. The apparatus according to any one of entries 1 to 13, wherein said medium (6) is an optical filter, a lense or a mirror.

Entry 18. A method for exactly positioning a medium (6) mounted on a spindle (4) at a predefined angular position, whereby the angular position of said medium with respect to a predefined reference position is controlled by means of encoder signal pulses and whereby the angular position of said medium can be continuously adjusted by adjusting means (10), characterized by the steps of a) pressing a friction element (2) against said spindle (4) using a predetermined friction force;

b) rotating said spindle (4) towards said predefined angular position by means of said adjusting means (10);

(c) stopping said spindle (4) at a predefined encoder signal pulse number $P_{In-x}$, said predefined encoder signal pulse number representing an angular position of said medium (6) close to said predefined angular position, whereby due to the mass moment of inertia of said spindle (4) and said predetermined friction force adjusted in step a) a static position of said spindle (4) between two encoder signal pulses is achieved;

d) stepwise rotating said spindle (4) by small angles until the encoder signal pulse $P_{In-1}$ is reached;

e) counting the number of steps necessary to move said spindle (4) to the encoder signal pulse $P_{In}$ next to said predefined angular position by moving said spindle (4) to said encoder signal pulse $P_N$ by means of said adjusting means (10); and f) based on said counted number of steps, calculating the number of steps necessary to move said spindle (4) to said predefined angular position.

Entry 19. The method according to entry 18, wherein said predetermined friction force is adjusted so that oscillations of the spindle (4) are excluded when said spindle (4) is stopped at said predefined encoder signal pulse number.

Entry 20. The method according to entry 19, wherein said friction force is adjusted so that the sliding friction or the static friction of said friction element (2) is greater than the force acting in the direction opposite to the direction of rotation of said spindle (4) when said spindle is stopped.

What is claimed is:

1. An apparatus for precisely positioning a storage disk, comprising:

a spindle configured for mounting the storage disk on the spindle;

a device coupled to the spindle for rotating the spindle to change the angular position of the storage disk with respect to a predefined reference position; and a metal bar pressed against the spindle for braking the spindle at a predetermined position and not allowing a swing back.

2. The apparatus of claim 1, wherein the device comprises a stepper motor, and wherein the metal bar comprises a flexible spring shaped as a bar.

3. The apparatus of claim 1, wherein the device comprises a stepper motor, and further comprising a friction wheel coupled to the stepper motor, wherein the friction wheel is selectably positionable in contact with the spindle.

4. An apparatus for precisely positioning a storage disk, comprising:

a spindle configured for mounting the storage disk on the spindle;

a stepper motor coupled to the spindle for rotating the spindle to change the angular position of the storage diskwith respect to a predefined reference position; and a flexible spring shaped as a bar adapted to be pressed against the spindle for braking the spindle at a predetermined position and not allowing a swing back.

5. The apparatus of claim 4, further comprising a friction wheel coupled to the stepper motor, wherein the friction wheel is selectably positionable in contact with the spindle for coupling the stepper motor to the spindle.

6. The apparatus of claim 5, further comprising a relay, wherein the bar is connected to the relay.

7. The apparatus of claim 6, wherein the relay is software-controllable.

8. The apparatus of claim 4, further comprising an air pressure cylinder, wherein the flexible spring is connected to the air pressure cylinder.

9. The apparatus of claim 4, wherein the flexible spring shaped as a bar is made of a metal.

10. The apparatus of claim 9, wherein the metal is aluminum.

11. The apparatus of claim 4, further comprising a low abrasive material, wherein the flexible spring shaped as a bar is coated with the low abrasive material.

12. The apparatus of claim 4, wherein the flexible spring shaped as a bar is made of teflon-coated steel.

13. The apparatus of claim 4, further comprising means for adjusting a force with which the flexible spring shaped as a bar is pressed against the spindle, wherein the means for adjusting the force is coupled to the flexible spring shaped as a bar.

14. The apparatus of claim 13, wherein the means for adjusting is a micrometer screw.

15. The apparatus of claim 4, further comprising the storage disk, wherein the storage disk comprises a magnetic disk.

16. The apparatus of claim 4, further comprising the storage disk, wherein the storage disk is an optical storage disk.

17. An apparatus for precisely positioning a medium, comprising:

a spindle configured for mounting the medium on the spindle;

means coupled to the spindle, for rotating the spindle to continuously change the angular position of the medium with respect to a predefined reference position; and a flexible spring shaped as a bar pressed against the spindle, for braking the spindle at a predetermined position and not allowing a swing back;

and further comprising the medium, wherein the medium is an optical filter.

18. An apparatus for precisely positioning a medium, comprising:

a spindle configured for mounting the medium on the spindle;

means coupled to the spindle, for rotating the spindle to continuously change the angular position of the medium with respect to a predefined reference position; and a flexible spring shaped as a bar pressed against the spindle, for braking the spindle at a predetermined position and not allowing a swing back;

and further comprising the medium, wherein the medium is a lens.

19. An apparatus for precisely positioning a medium, comprising:

a spindle configured for mounting the medium on the spindle;

means coupled to the spindle, for rotating the spindle to continuously change the angular position of the medium with respect to a predefined reference position; and a flexible spring shaped as a bar pressed against the spindle, for braking the spindle at a predetermined position and not allowing a swing back;

and further comprising the medium, wherein the medium is a mirror.

20. A method for positioning a storage disk mounted on a spindle at a predefined angular position, the method comprising the following operations:

mounting the storage disk on the spindle;

using the amount of electrical current of a relay to press a flexible spring shaped as a bar against the spindle using a predetermined friction force;

rotating the spindle towards the predefined angular position;

stopping a stepper motor at a predefined encoder signal pulse number $P_{In-x}$ so that a static position of the spindle is achieved between two encoder signal pulses;

rotating the spindle stepwise until an encoder signal pulse $P_{In-1}$ is reached;

moving the spindle to the encoder signal pulse $P_{In}$;

counting the number of steps necessary to move the spindle from the signal pulse $P_{In-1}$ to the signal pulse $P_{In}$; and based on the number of steps counted, calculating the number of steps necessary to move the spindle to the predefined angular position.

21. The method of claim 20, further comprising the operation of adjusting the predetermined friction force so that oscillations of the spindle are excluded when the stepper motor is stopped at the predefined encoder signal pulse number $P_{In-x}$.

22. The method of claim 20, further comprising the operation of adjusting the predetermined friction force so that the force of static friction, $F_{StSB}$, is greater than a force $F_E$.

* * * * *